United States Patent [19]

Wilking et al.

[11] 4,371,207

[45] Feb. 1, 1983

[54] POSITION ADJUSTER FOR MOTOR VEHICLE SEATS AND WINDOWS

[75] Inventors: Hans Wilking, Rothselberg; Egon Kafitz, Hochspeyer, both of Fed. Rep. of Germany

[73] Assignee: Keiper Automobiltechnik GmbH & Co. KG, Remscheid, Fed. Rep. of Germany

[21] Appl. No.: 249,342

[22] Filed: Mar. 31, 1981

[30] Foreign Application Priority Data

Apr. 5, 1980 [DE] Fed. Rep. of Germany ....... 3013304

[51] Int. Cl.³ .................... A47C 1/025; F16H 55/18
[52] U.S. Cl. .................... 297/348; 74/411.5;
74/440; 74/804; 297/362
[58] Field of Search ............ 297/348, 362, 355;
248/422; 74/411.5, 440, 804, 805

[56] References Cited

U.S. PATENT DOCUMENTS 4,025,109 5/1977 Klingelhofer et al. ......... 297/362 X
4,227,741 10/1980 Gross et al. .................... 297/362

FOREIGN PATENT DOCUMENTS 532583 7/1920 France .................... 74/440

Primary Examiner—William E. Lyddane
Attorney, Agent, or Firm—Michael J. Striker

[57] ABSTRACT

Position adjuster for the angular or vertical adjustment of a motor vehicle seat or for lifting a window, includes two mount levers connected respectively to a pair of wobble gears controlled by an eccentric; the eccentric is formed of a carrier disk rigidly connected to a rotary shaft and defining a concentric circumferential portion limited by two radially directed abutment surfaces and forming with the center of the shaft an angle of more than 180°; the eccentric part is formed of two circumferentially movable wedge-like segments urged one from the other by a pressure spring so that during the rest position of the adjuster the segments are in their locking position, in which radial play in bearings and backlash in the teeth of wobble gears is eliminated; during the rotation of the shaft, one of the segments is displaced against the biasing spring and radial play facilitating the manipulation is introduced between the wobble gears.

14 Claims, 12 Drawing Figures

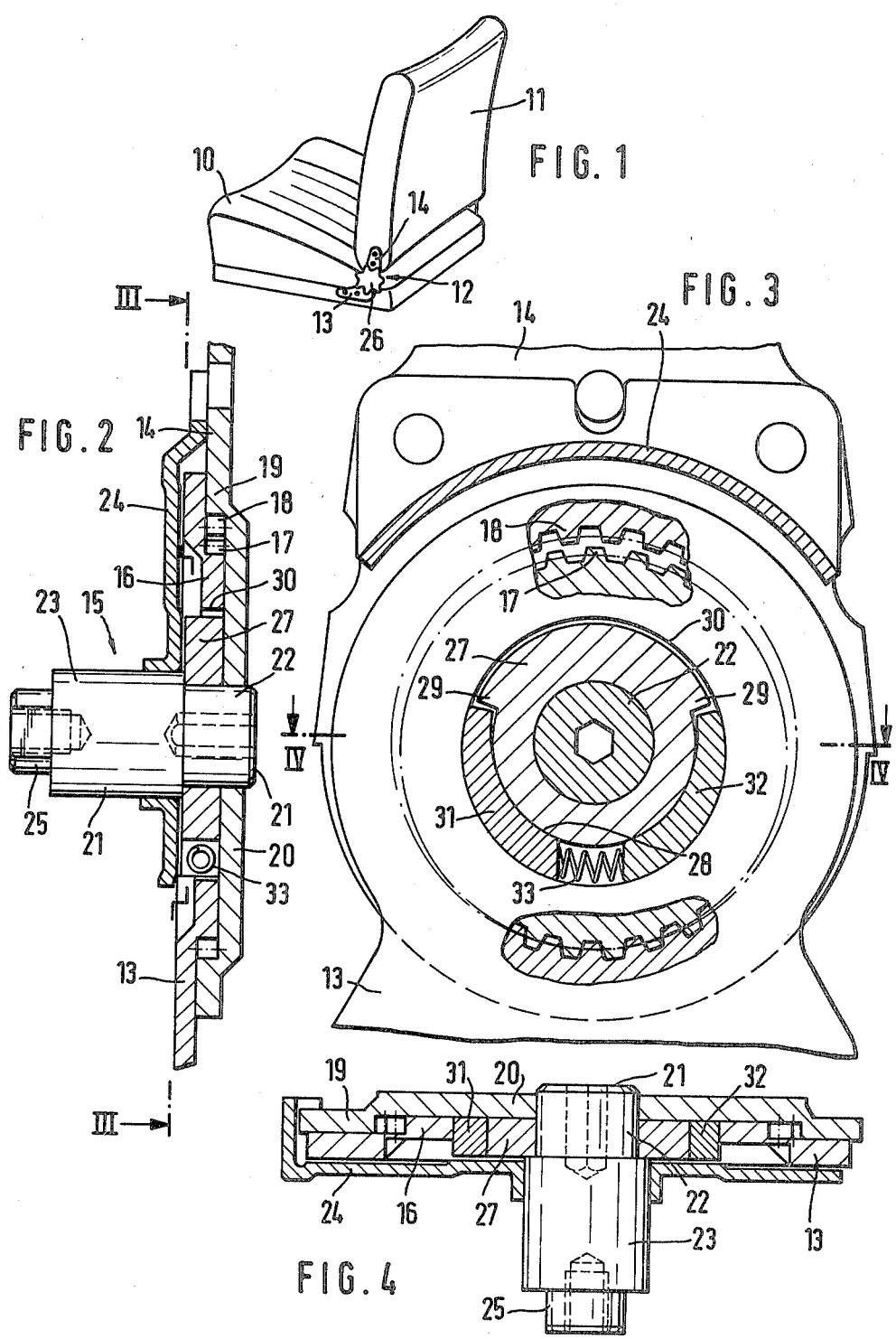

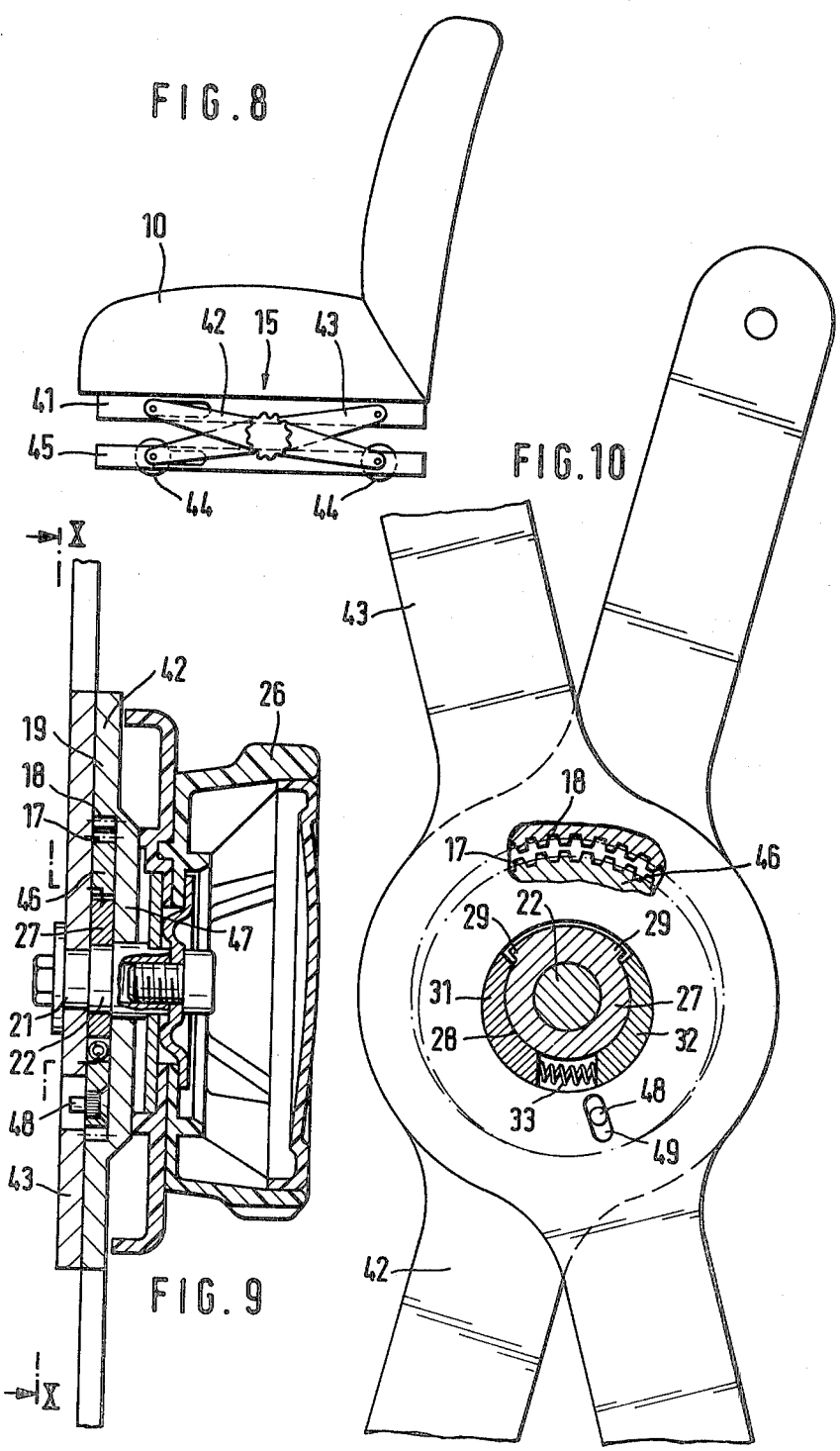

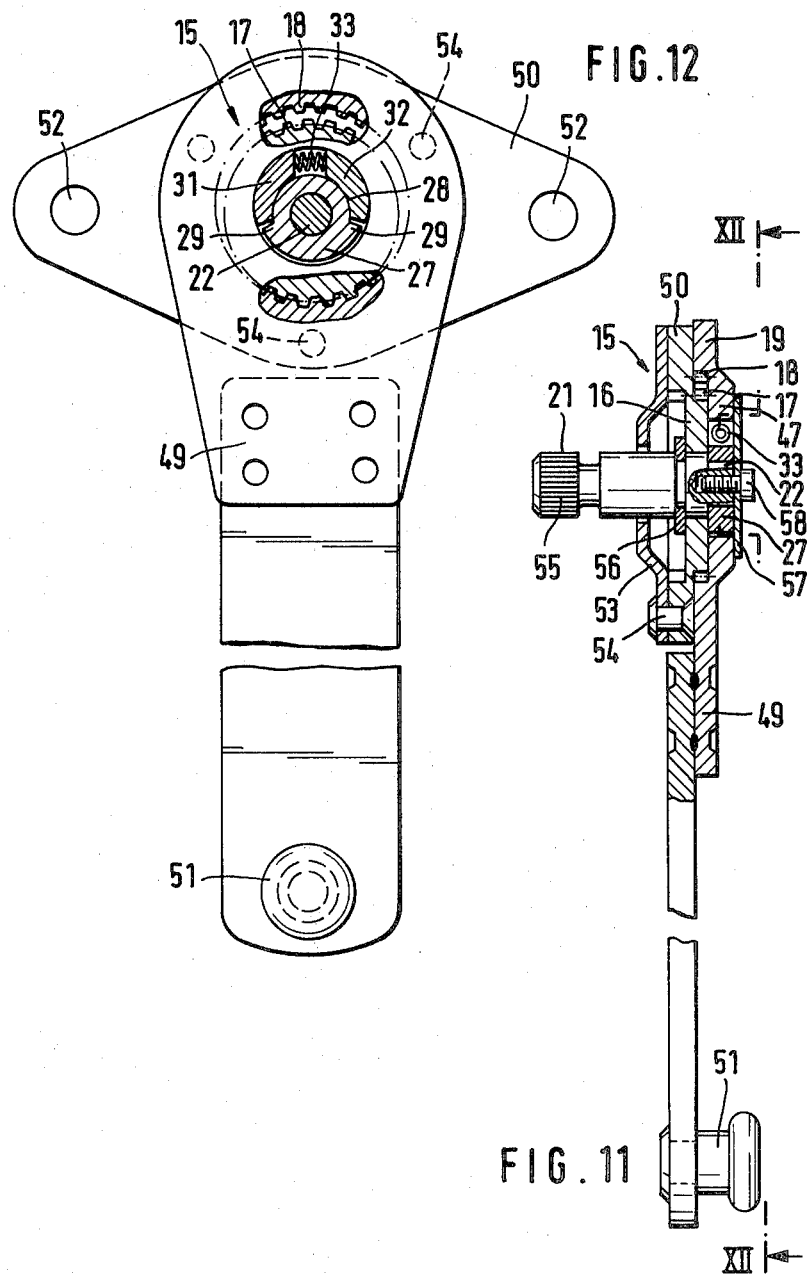

POSITION ADJUSTER FOR MOTOR VEHICLE SEATS AND WINDOWS

BACKGROUND OF THE INVENTION

This invention relates generally to position adjusters for seats and/or windows, particularly for use in motor vehicles. The adjuster is of the type having hinge mount levers joined together by a rotary shaft, an inner gear connected to one lever and a spur gear ring connected to the other lever and being in mesh with the inner gear, the crown circle of the spur gear ring being smaller at least about one tooth than the root circle of the inner gear, and one of the levers being supported for rotation on an eccentric connected for joint rotation with the driven shaft.

Adjusters of this kind are employed in hinge mounts for seats having reclinable back rests, whereby one of the mount levers is connected to the seat proper, and the other mount lever is connected to the back rest. In rotating the eccentric the spur gear ring is rolled in mesh with the inner gear and consequently an inclination corresponding to the difference between the teeth of the two gears is imparted to the hinged lever, whereby this angular position adjustment is performed continuously and the resulting adjuster is simple in structure, occupies minimum space and can be exposed to high loads. In addition, due to the different number of teeth between the meshing gears and due to the corresponding eccentricity of the eccenter a self-locking effect between the wobbling gears is achieved, thus ensuring that the adjuster is reliably held in any adjusted position and the backrest itself even under extreme overloads cannot be unintentionally released. These known hinge mounts are therefore very advantageous. Nevertheless, in order to secure a comfortable manipulation of the adjuster, a considerable lateral and radial play must be provided between the meshing teeth of the inner gear and of the spur gear ring, which in response to the rotary movement of the eccenter performs a rolling or wobbling movement in the inner gear. Due to the unavoidable tolerances occurring during mass production, this relatively large radial play may become still larger and, as a result, the hinge mount assembly, particularly when the backrest is not under load, may produce rattling noises due to vibrations occurring upon the starting of the vehicle.

Apart from the aforedescribed application of these hinge mounts for the angular position adjustment of a backrest, it is also known to employ these adjusters for setting the vertical or longitudinal position of the seat. In a known device for adjusting the vertical position of the seat, a pair of scissors-like two-arm mount levers is connected to lateral sides of each seat proper. In the region of crossing of each pair of levers, an adjusting and locking device in the form of wobble gears is arranged, whereby the wobble gears are controlled similarly to the preceding adjuster by means of an eccentric rigidly mounted on a driven rotary shaft. This rotary shaft also joins the crossing parts of the levers in axial direction. Since the hinge mount levers are to be free from the wobbling movement of the gears in the adjusting mechanism, the gear supported on the eccentric is pivotally connected via a pin to the assigned hinge mount lever, whereby the pin engages an oblong slit in the lever so as to permit the movement of the eccentric. At the same time, both mount levers are supported for rotation about a common axis on the shaft. Each mount lever in this vertical position adjusting device is secured at one end thereof to the seat proper and at the other end is supported on a floor rail. Even this known vertical position adjusting device requires considerable radial play which still can be increased due to manufacturing tolerances between the teeth and bearings of the gears, resulting in rattling noises during the motion of the vehicle when the seat is unloaded.

Moreover, the adjusters of the aforedescribed type can be also used in windows lifters for motor vehicles whereby one hinge mount lever is secured to the body of the motor vehicle, whereas the other mount arm acts as an adjustment arm cooperating in a known manner with the window. The hinge mount levers, even in this application, are mutually joined by means of a shaft which is again provided with an eccentric for transmitting rotary movement to an input gear of a wobble gear type adjusting and locking device for determining the position of the two hinge parts. Similarly as in the preceding examples, the teeth of the inner gear connected to one hinge mount lever and of the spur gear connected to the other lever, as well as the bearings, are manufactured with unavoidable tolerances, increasing the existing relatively large radial play of these component parts and contributing to the chatter of the window adjuster, particularly when the motor vehicle is subject to vibrations caused by uneven roads.

It is true that hinge mounts are known wherein attempts have been made to design a construction which is not susceptible to chatter or other noises. These known designs, however, even if not completely unsuccessful, have produced only partially satisfactory results. For example it is known to assign to the wobble gears a disk which is elastically supported on the eccentric. For this purpose, two bearing shells have been employed enclosing therebetween a ring-shaped body of an elastic material. By compressing such ring-shaped body, the existing tolerances were supposed to be eliminated and a play-free movement between the parts of the wobble gears was supposed to be achieved. Nevertheless, the rattling noises may still occur in this solution, inasmuch as the rattling can be avoided only when the radial load is lower than the restoring force resulting from the elasticity of the ring-shaped body.

In order to eliminate the radial play, another hinge mount of this kind has a section of its rotary shaft provided with a wedge-like surface surrounded by a sleeve-like portion of an eccentric member provided with an inclined surface cooperating with the wedge-like portion. The eccentric rotatably supports a spur gear assigned to one of the hinge mount levers of the adjuster. The rotary shaft is axially shiftable, and its wedge-like section is thrust by means of a spring assembly in the direction of increased eccentricity of the eccentric sleeve. By virtue of this spring-loaded eccentricity, it is possible to engage the teeth of the wobble gears without play, and consequently a chatter-free arresting of the adjusted position of the hinge mount levers is attained. Nevertheless, to enable the adjusting movement of the hinge mount lever connected to the backrest, a disengagement of the interlocked surfaces is necessary. This disengagement is carried out by axially displacing the rotary shaft until the wedge-like surface of its adjusting section is withdrawn from the sleeve-shaped eccentric member. The resulting advantage of an easy manipulation of the control handle during the adjusting or locking operation of the wobble gears, because of the cancellation of the play-free condition, necessitates however a large number of additional elements which must be arranged in a manner requiring relatively large installation space, thus increasing particularly the structural depth of the adjuster. In addition, the manufacture of these additional component parts and their installation are expensive and in many cases it appears that the expenditures for achieving the limited ease of control of the adjuster are unjustified.

In still another prior-art design of the adjuster for compensating the radial play of its hinge mounts, the rotary shaft is provided with a non-circular carrier section for transmitting the rotary movement to an eccentric member which is displaceable in radial direction towards its eccentric dimension. Between the eccentric member and the carrier section of the shaft there is provided an elastic buffer member, by means of which the part of the wobble gear mounted on the eccentric member is pressed into engagement with the teeth of the other wobble gear. Even in this solution, the compensation of the radial play is effective under the condition only that the radial load produced by the backrest is lower than the restoring force resulting from the elasticity of the buffer member. Moreover, this solution has the disadvantage that an amount of radial play desired for facilitating the adjusting movement is eliminated and consequently an increased resistance to the adjusting manipulation must be overcome.

SUMMARY OF THE INVENTION

It is therefore a general object of the present invention to overcome the aforementioned disadvantages.

More particularly, it is an object of the invention to provide an improved position adjuster of the aforedescribed type, in which during a set position of the adjuster the play between the teeth of the wobble gears on the one hand and between the bearings of the rotary axle and of the eccentric on the other hand is eliminated in a very simple manner, whereas during the adjusting movement the necessary play between the hinge mount levers of the adjuster is automatically established.

In keeping with these objects, and others which will become apparent hereafter, one feature of the invention resides in the provision of a carrier disk rigidly connected to the rotary axle of the adjuster and of two mutually inclined wedge-like segments partially surrounding the circumference of the carrier disk, and resilient pressure means arranged between the facing ends of the segments to thrust the same one from the other. By means of this particular structure of the eccentric, it is assured that radial forces resulting from the loads of the movable hinge mount lever and counteracting the present clamping force resulting from the pressure spring between the wedge-like segments when the rotary shaft is released, cannot become effective, inasmuch as these radial forces are directly intercepted by the wedge-like segments and transmitted via the carrier disk on the rotary shaft. The locking stress of the wedge-like segments can be removed by circumferentially directed forces only, and this feature is utilized in this invention for releasing the segments when the readjustment of the movable hinge mount lever is required. Immediately upon imparting a rotary movement in one or the other direction of rotation to the shaft of the adjuster, the carrier disk which is rigidly connected to the rotary shaft engages the end face of one of the segments and displaces the same in the circumferential direction against the intermediate spring means, thus releasing the stress between the shaft and the inner wall of the spur gear ring. As a consequence, upon initiating the adjustment process, both play between the teeth of the wobble gears and also play in the shaft bearings is introduced. As soon as the adjustment movement is completed, the intermediate pressure spring means urge the wedge-like segments again into their locking position, in which the radial play is again eliminated. No additional control elements are required for establishing the locked and unlocked condition of these segments.

In order to eliminate both the backlash in the teeth of the wobble gears simultaneously with the bearing play between the eccentric and the supporting rotary shaft, in the preferred embodiment of this invention the carrier disk is formed with a circumferential section which is concentric to the shaft and extends over a central angle of more than 180° to support the two wedge-like segments. Another circumferential section of larger diameter forms at its ends two stop noses for engaging the end faces of the segments. The radial dimension of the cylindrical wedge-like segments slightly exceeds the height of the abutment surfaces or noses. Due to the fact that the wedging segments extend over the circumference of the carrier disk and thus over the circumference of the rotary shaft at an angle exceeding 180°, the segments engage via the carrier disk the shaft in such a manner that a certain amount of play is permitted between the inner wall of the spur gear and the carrier disk at a side opposite the point of engagement of teeth of the spur gear ring and the inner gear. The eccentricity of the combined carrier disk and the wedge-like segments at the same time is sufficient to keep rolling engagement of the two wobble gears.

In order to prevent a premature termination of the movement of the wedge-like segments, it is another feature of this invention that the ends of the segments remote from the intermediate pressure spring means are reduced in thickness and that the overall length of the wedge-like segments is dimensioned such that in the locking position of the wedges a slight clearance is left between the end faces of the wedges and the abutment surfaces of the carrier disk.

The intermediate resilient pressure means between the facing ends of the wedge-like segments can be made in the form of elastic buffer members made of plastic and the like or in the form of pressure springs. In order to protect these intermediate spring elements against compression beyond their elastic deformation limit during the releasing movement of the shaft, there is arranged, according to another feature of this invention, a stop member for limiting the displacement of the spring elements by the moving segment. The size of this stop member of course must be such that it does not interfere with a trouble-free displacement of the segments. The stop member can be made in many forms. For instance, it is possible to make the stop member in the form of an abutment extension projecting from the facing end surfaces of the wedge-like segment. Or, in another embodiment, the stop member is in the form of a fitting piece fixedly mounted on the shaft and projecting between the facing end surfaces of the segments. In still another embodiment, the stop member is in the form of a spacer which is loosely supported in the space surrounded by the spring.

According to another embodiment of this invention, it is possible to dispense with the rigid connection between the carrier disk and the rotary shaft when the latter is provided with an axial groove for receiving carrier claws engageable with the wedge-like segments which, in this modification, are supported for movement directly on the driving shaft. The groove is with advantage arranged in the range of the facing end surfaces of the wedge-like elements.

The aforedescribed construction of the eccentric for an adjuster in which radial play or backlash is eliminated is assembled substantially of simple stamped and machined parts which, in contrast to prior-art structures of this kind, do not require any additional manufacturing and installation expenditures for achieving the same effect, namely the elimination of the radial play.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a motor vehicle seat with a reclinable backrest and having an adjuster of this invention mounted between its seat part and backrest part;

FIG. 2 is a sectional elevation view of the seat position adjuster according to FIG. 1;

FIG. 3 is a front view, partly in section, of the adjuster of FIG. 2, taken along the line III—III;

FIG. 4 is a sectional top view of the adjuster of FIGS. 2 and 3, taken along the line IV—IV;

FIG. 8 is a side view of a motor vehicle seat with a vertical position adjusting device incorporating scissors-like mount levers and an adjuster according to this invention;

FIG. 9 is a sectional side view of the vertical position adjuster of FIG. 8;

FIG. 10 is a front view of the position adjuster of FIG. 8 taken along line X—X;

FIG. 11 is a sectional side view of a window lifter incorporating the position adjuster of this invention;

FIG. 12 is a front view of the window lifter of FIG. 11 taken along the line XII—XII.

DESCRIPTION OF THE PREFERRED EMBODIMENTS

Figure 5:
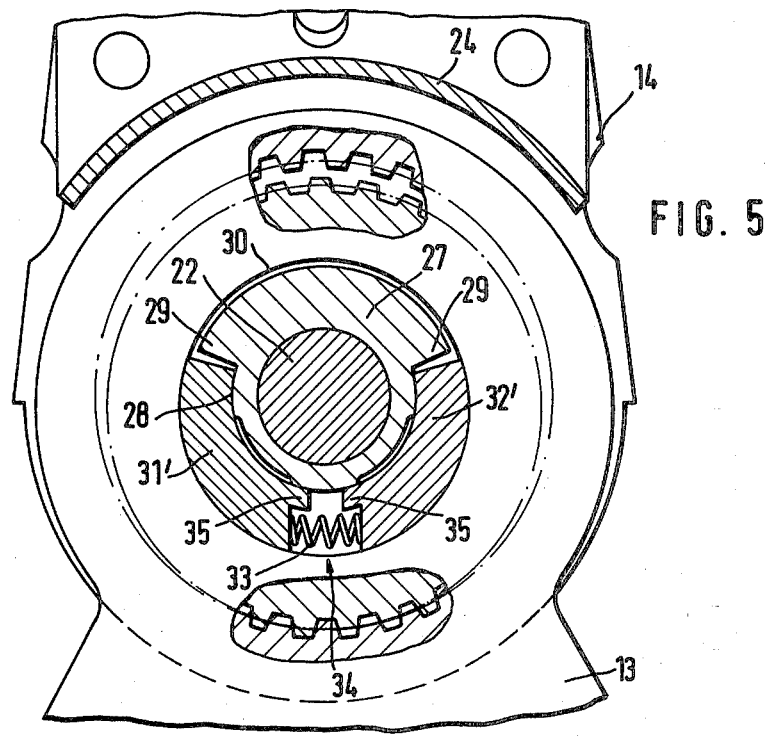
FIG. 5 shows a modification of the adjuster according to FIG. 3.

The position adjuster according to this invention will be first explained in connection with an example of a motor vehicle seat 10 having a reclinable backrest 11, as depicted in FIG. 1. The angular position adjuster 12 includes a hand-operated control handle 26 connected to a wobble gear adjusting mechanism 15, a fixed mount lever 13 connected to the seat part 10 and a tiltable mount lever 14 connected to the backrest 11. Referring now to FIGS. 2–4, the adjusting mechanism 15 is constituted by a spur gear ring 16 formed for example by stamping in the mount lever 13 and defining outer teeth 17 which at one point are in mesh with the teeth 18 of an inner gear 19 which is also preferably manufactured by stamping the mount lever 14. The diameter of the crown circle of the outer teeth 17 is less, at least about the height of one tooth, than the diameter of the root circle of the inner teeth 18. Accordingly, the number of teeth 17 and 18 differs at least about one tooth whereby the number of teeth in the inner ring gear is larger than that in the spur gear 16. The two gears 16 and 19 are designed such that the inner teeth formed on the tiltable hinge mount 14 can roll on the outer teeth 17 formed on the stationary hinge mount 13.

The disk 20, raised during the stamping out of the inner gear 18 on the hinge mount lever 14, is supported at its center on an end section 22 of the rotary shaft 21. The adjoining concentric section 23 of shaft 21 is increased in diameter and supports for rotation the side plate 24 which at one side is rigidly connected to the tiltable lever 14 and covers the wobble gears 16 and 19. Another concentric section 25 is formed on the end face of the section 23 and has a non-circular circumference, to engage a corresponding recess in the control handle 26. The center of the end section 25 has a threaded bore for receiving a mounting screw of the handle.

An eccentric is formed, in accordance with this invention, of a carrier disk 27 and of two wedge-shaped cylindrical segments 31 and 32 slidably supported on the carrier disk. The carrier disk is rigidly connected to the section 22 of the shaft 21 by pressing on or by heat shrinking. As seen in the embodiments according to FIGS. 3, 5 and 7, the circumference of the carrier disk 27 defines two regions, one region being of a uniform smaller diameter and extending over a central angle of more than 180°, in this example about 220°, whereas the other region of a larger radius defines two noses or abutment surfaces 29 delimiting the ends of the region 28. In a modification, it is possible to create these abutment surfaces by other means than by the aforedescribed abrupt increase of diameter of the carrier disk, for example by means of fixed abutment pins, stop cams and the like.

As mentioned before, hinge mount lever 14 is rotatably supported on section 22 of the shaft 21 so that toothing of the inner gear 19 is rotatable concentrically with the shaft 21. By contrast, the wobbling spur gear ring 16 of smaller diameter engages with its outer teeth 17 at one point with the inner teeth 18 and consequently the center of the spur gear ring is offset about the difference of the wobbling circles circumscribed by the meshing point from the axis of the shaft 21. This difference defines the measure of eccentricity of the wobbling gears 16 and 19, resulting in a crescent-shaped interspace between the inner wall of the central bore 30 of the spur gear 16 and the circumferential region 28 of the carrier disk 28. This crescent-shaped interspace accommodates two mirrors symmetrically arranged wedge-shaped tubular segments 31 and 32 having the same configuration and size and being spaced apart one from the other by means of resilient pressure means 33 engaging the facing ends of respective segments. The resilient pressure means, in this example a pressure spring 33, is dimensioned such that in an inactivated condition of the adjuster the two segments are locked between the carrier disk portion 28 and the inner wall 30 in such a manner that their end faces remote from the spring 33 define a small clearance with respect to the abutment steps 29 on the carrier disk 27. It is evident that the pressure spring 33 employed in the exemplary embodiments could be readily replaced by a buffer member of a resilient plastic material or of rubber or the like.

Figure 6:
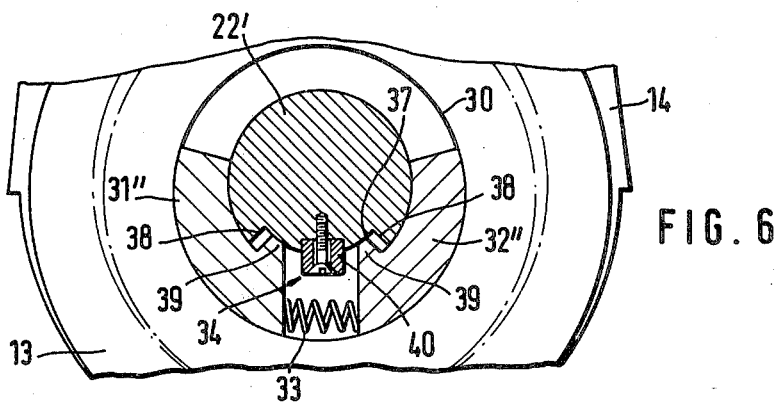
FIG. 6 is a cut away portion of another modification of the adjuster according to FIG. 3.
Figure 7:
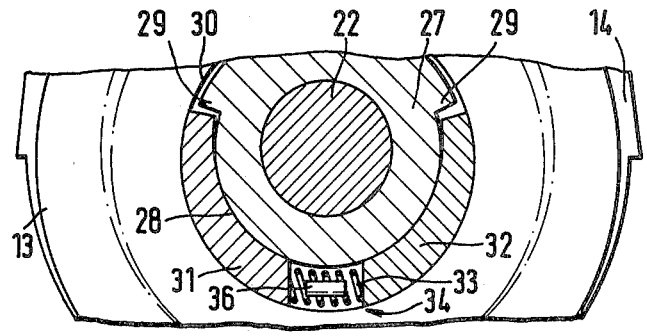
FIG. 7 shows in a front view a cut away part of still another embodiment of the seat adjuster of this invention.

In the modifications illustrated in FIGS. 5-7, the compressibility of resilient pressure means 33 in the adjuster according to this invention is limited by stop means 34 which prevents the resilient pressure means from being compressed beyond the deformation limit of their elasticity. In FIG. 5, stop means 34 are in the form of abutment extensions 35 formed opposite each other on respective wedge-like segments 31' and 32'. The combined length of these projections 35 is slightly more than half the length of the compressed spring 33 engaging the end faces of the segments beside the projection 35.

In the embodiment according to FIG. 7, stop means 34 are constituted by a spacer 36 located inside the helical pressure spring 33. The spacer 36 is preferably in the form of a pin the length of which is slightly larger than the length of the completely compressed pressure spring 33.

In the embodiment according to FIG. 6, the carrier disk is formed integrally with the shaft section 22' which in this embodiment is provided with a recess 37 defining two radial abutment surfaces 38 cooperating with inwardly projecting noses 39 of wedge-like segments 31" and 32" which are movable on the cylindrical surface of the shaft section 22'. The opposite end faces of the noses 39 are resiliently spaced apart by the pressure springs 33. Stop means in this example are in the form of a fitting piece 40 secured to the shaft section 22' in the recess 37 midway between the abutment surfaces 38. This fitting piece can be made also of a resilient material and is fastened to the section 22' by a screw.

The thickness of the piece 40 is again slightly larger than the length of the completely compressed spring 33.

FIGS. 8-10 illustrate a modification of the adjuster according to this invention in a continuous vertical position adjusting device for motor vehicle seats. A frame 41 of the seat part 10 is linked by means of a scissors-like arrangement of crossing hinge mount levers 42 and 43 to the ground frame 45. The upper end of the mount lever 43 is hinged to the rear portion of the seat frame 41 by a non-illustrated pivot pin, whereas the upper end of the other mount lever 42 is provided with a pivot pin which is guided in an oblong slot in the frame 41. The lower ends of the mount levers 42 and 43 are provided with guide rollers 44 rotatable about projecting pins passing through the ground frame 45, whereby the projecting pin at the lower ends of the mount lever 43 is guided in a horizontal oblong slot formed in the frame 45. The crossing parts of the levers 42 and 43 are interconnected by the position adjuster 15 according to this invention, corresponding essentially to that described in the preceding examples. In particular, mount lever 42 is shaped with an inner gear 19 manufactured by stamping for example and defining inner teeth 18 which are engageable at one point with the outer teeth 17 of a spur gear ring 46 which is driven by means of an eccentric 27, 31 and 32, fixed on the rotary shaft section 22. Similarly as in the preceding examples, the diameter of the crown circle of tooth ring 17 of the spur gear ring 46 is again less about the height of one tooth than the diameter of the root circle of teeth 18 of the inner gear 19, whereby the difference in number of teeth 17 and 18 is at least one tooth. Hinge mount lever 42 is again supported for rotation about the shaft 21 at the center of embossed disk 47, resulting from the stamping of the inner gear 19, and the spur gear ring 46 connected to the other mount lever 43 has its center bore arranged around the section 22 of the shaft 21, whereby the inner diameter of the center bore is substantially larger than the diameter of the section 22. The shaft section is again rigidly connected to a carrier disk 27 which defines a concentric circumferential portion 28 forming with the center of the shaft 21 an angle of more than 180° and being limited at its ends with abutment surfaces 29. The carrier disk 27 is surrounded by the central bore of the spur gear ring 46 which, due to the one-input engagement with the teeth of inner gear 19, is eccentrically offset relative to the axis of the shaft 21. Accordingly, a crescent-shaped or sickle-shaped space results between the inner wall of the bore and the circumference of the carrier disk 27 which, again as in the preceding examples, is occupied by two consecutively arranged wedge-like segments 31 and 32 which are supported for movement in the circumferential direction on the concentric surface 28 of the disk 27 and are urged one from the other by an interposed pressure spring or pressure means 33.

In order to prevent the transmission of the eccentric or wobbling movement of the spur gear 46 on the mount lever 43, the spur gear 46 is provided with a carrier pin 48 projecting in the direction away from the embossed disk 47 and being movable in an oblong guiding slot 49 in the hinge mount lever 43.

A modified application of the position adjuster of this invention in a window lifter is depicted in FIGS. 11 and 12. In the Figures, only those parts of the window lifter are illustrated which are necessary for the disclosure of this invention, whereby the window pane and its associated guiding and mounting means can be of any suitable design well known in the art. The essential construction parts of the window lifter include a rotary hinge lever 49 forming an adjustment arm, a hinge lever 50 fixedly mounted to the motor vehicle body, and an adjusting device 15 connecting both hinged levers. The free end of hinge lever 49 is provided with a coupling member 51 which engages conventional, non-illustrated guiding means of the window. The arms supporting the member 51 is connected to the hinge lever 49 by welding for example. The hinge lever 49 is again in the form of a side plate manufactured by stamping together with the teeth 18 of an inner gear 19. The embossed disk 47 in the range of the inner gear 19 is wedged by a side plate 47 supported for rotation on an eccentric which is rigidly connected to a section 22 of a rotary shaft 21. To accommodate the eccentric, the central bore in the side plate 47 has a diameter which is substantially larger than the diameter of the shaft section 22. Teeth 18 of the inner gear on lever 49 are in mesh at one point with the teeth 17 of a spur gear ring 16 which is again manufactured for example by stamping on the other mount lever 50.

The mount lever 50 has the form of a flange bearing and is fastened by screws, for example, passing through lateral holes 52 to a corresponding part of the motor vehicle body. The stationary mount lever 50 is rigidly connected for instance by rivets 54 to a side plate 53 which has a bore for passing through the rotary shaft 21. The projecting end portion 55 of the shaft 21 is formed with splines for example for engaging a non-illustrated control handle.

The illustrated adjusting device 15 for the window lifter according to FIGS. 11 and 12 also includes wobble gears in which the crown circle of the outer gear 17 is smaller in diameter than the root circle of the inner gear 18 at least about the height of one tooth. The teeth 17 and 18 of respective wobble gears have also different numbers of teeth, whereby the inner gear 19 has at least one tooth more than the outer gear 16. Similarly as in the preceding examples, the adjuster 15 in this embodiment also includes a shaft section 22 which is rigidly connected to a carrier disk 27 forming a part of an eccentric. The carrier disk defines also a circumferential portion 28 concentric with the axis of the shaft 21 and forming an angle of more than 180°. This circumferential portion 28 is also limited by radial abutment surfaces 29 at respective ends thereof. The inner diameter of the spur gear ring 16 is larger than the diameter of the carrier disk 27, and the resulting crescent-shaped interspace between the circumferential section 28 and the inner wall of the central bore of the spur gear 16 accommodates two consectively arranged, wedge-like segments 31 and 32 biased one from the other by resilient pressure means 33. The axial connection of the two mount levers 49 and 50 is ensured by safety ring 56 engaging a corresponding groove adjoining the inner surface of the stamped out disk 47 on the one side and an axial bolt 58 passing through the side strap 57 and engaging a threaded axial hole in the shaft 21.

The operation of the position adjuster 15 is as follows: As seen particularly from FIGS. 3, 5, 7, 10 and 12, the wedge-like segments 31, 31', 31" and 32, 32', 32" are urged by the pressure spring 33 to move away from each other in the crescent-shaped interspace between the circumferential section 28 of the carrier disk 27 and the inner wall 30 of the central bore of spur gear ring 16 or 46 or, in the modified version according to FIGS. 11 and 12, the central bore in the embossed disk 47. As a result, during the inactive rotary shaft 21 the teeth 17 and 18 of respective wobble gears 16 and 19 are urged in radial direction into engagement with each other at the adjusted point of engagement in such a manner that any backlash between the meshing teeth is eliminated. In addition, due to the fact that both wedge-like segments 31 and 32 or 31' and 32' cover a circumferential section of bore 30 in spur gear ring 16 of more than 180°, any play in the bearings of the rotary parts of the adjuster is also removed.

Upon actuation of the rotary shaft 21, that is, when the shaft is rotated by the handle 26 clockwise for example, shaft section 22, together with the attached carrier shaft 27, are rotated in the same direction so that one of the radial abutment surfaces 29 on the carrier disk 27 engages the tapering end part of the segment 32 and, by continuing the rotation of the shaft 21 clockwise, the abutment 29 displaces the segment 32 along the circumferential section 28 against the pressure springs 33. The intermediate pressure spring 33 is compressed to a point determined by the stop member 34, and at this point the locking stress between the carrier disk 27 and the spur gear 16 is relieved. In continuing the rotation in clockwise direction, the engagement point of the teeth of the spur gear 16 with the inner teeth of gear 19 varies in accordance with the rotation of the eccentric, and the rotatable hinge mount lever is angularly displaced relative to the other, fixed lever. As soon as the handle 26 with the rotary shaft 21 is inactivated, pressure spring 33 returns the wedge-like segment 32 into its original locking position, in which both the backlash of the engaging teeth and the radial play in the bearings are effectively eliminated and the adjuster is not susceptible to generate any rattling noises.

In the embodiment according to FIG. 6, the rotation of the shaft 21 causes the radial abutment surfaces 38 in the shaft section 22' to displace according to the direction of rotation one of the two wedge-like segments 32" or 31" against the biasing force of the resilient pressure means 33. Similarly as in the other embodiments, the locking stress between the shaft section 22 and the inner wall of the bore 30 of the spur gear ring 16 is relieved, and consequently a certain amount of radial play facilitating the adjusting movement of the wobble gear adjuster is introduced. In continuing the rotation of the shaft 21, the eccentric causes the spur gear to roll along the teeth of the inner gear and the mount lever 14 is angularly adjusted. As soon as the shaft 21 is inactivated, pressure spring 33 establishes again the locking position of the wedge-like segments 31" and 32" and the backlash as well as the radial play are again eliminated.

It will be understood that each of the elements described above, or two or more together, may also find a useful application in other types of constructions differing from the types described above. For instance, it is possible to realize the support of respective wobbling gears in such a manner that bore 30 cooperating with the eccentric is provided in the mount lever formed with the inner gear 19 whereby the spur gear 16 is immediately supported on the shaft section 22, whereas the bore 30 engages as described above the eccentric assembled of the carrier disk 27, the wedge-like segments 31 and 32, and the intermediate pressure spring 33. In still another modification, it is possible to replace the recess 37 according to FIG. 6 by a carrier formed of an annular sleeve which is recessed in a corresponding angular sector and rigidly connected to the shaft section 22'.

While the invention has been illustrated and described as embodied in a position adjuster for use with motor vehicle seats and windows, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A position adjuster for seats and/or windows, particularly in motor vehicles, comprising two mount levers, a rotary shaft for interconnecting said levers, an inner gear connected to one lever and a spur gear ring connected to the other lever and being in mesh with said inner gear, the crown circle of said spur gear ring being smaller at least about one tooth than the root circle of said inner gear, an eccentric arranged for joint rotation with said shaft and supporting one of said gears to impart a wobbling movement thereto, said eccentric including a carrier disk connected to said rotary shaft, a pair of wedge-like segments supported one after the other for movement on a major portion of the circumference of said carrier disk, and a resilient pressure means arranged between said segments to urge the same one from the other into a locking position in which radial play between the assigned gear and said carrier disk is eliminated, whereby during the rotation of said shaft said segments are displaced towards each other against said pressure means to permit a radial play between said gear and said carrier disk.

2. An adjuster as defined in claim 1, wherein said carrier disk is formed with a circumferential section concentric with the axis of said rotary shaft and forming with said axis a central angle of more than 180°, and two radial abutment surfaces terminating said circumferential section, whereby said wedge-like segments are movable between said abutment surfaces.

3. An adjuster as defined in claim 2, wherein the configuration of said wedge-like sectors with respect to the supporting circumferential section of the carrier disk and the surrounding bore of the assigned gear is such as to define a small clearance between the abutment surfaces and the opposite end faces of said segments when said resilient pressure means is in its fully extended condition.

4. An adjuster as defined in claim 2, wherein the outer end portions of respective segments are reduced in thickness.

5. An adjuster as defined in claim 1, further including a stop member arranged between the inner end faces of said segments in the range of said resilient pressure means.

6. An adjuster as defined in claim 5, wherein said stop member is constituted by two juxtaposed noses projecting from the facing end surfaces of said wedge-like segments.

7. An adjuster as defined in claim 5, wherein said stop member is constituted by a spacer loosely inserted in the resilient pressure means.

8. An adjuster as defined in claim 5, wherein said stop member is constituted by a fitting piece secured to the shaft midway between the facing end surfaces of said wedge-like segments.

9. A position adjuster as defined in claim 1, wherein said mount levers are arranged into a crossing scissors-like configuration, whereby said rotary shaft is provided in the crossing region of said levers.

10. An adjuster as defined in claim 9, wherein the gear cooperating with said eccentric is provided with a projecting pin and the adjoining lever is provided with a guiding slot engaging said pin to compensate for the eccentric movement of said one gear.

11. An adjuster as defined in claim 1, wherein one of said mount levers is rigidly connected to the body of the motor vehicle and the other mount lever is coupled to a movable part of the vehicle.

12. An adjuster as defined in claim 10, wherein said spur gear is directly supported for rotation on said rotary shaft and said inner gear is formed with a central bore cooperating with said eccentric.

13. A position adjuster for seats and/or windows, particularly in a motor vehicle, comprising hinge mount levers interconnected by a rotary shaft, an inner gear formed on one of said levers and a spur gear ring formed on the other lever and having the crown circle of its teeth less at least about the height of one tooth than the root circle of the inner gear, an eccentric arranged for joint rotation with said shaft and supporting one of said gears, said eccentric including a recessed portion in said shaft defining two radially directed abutment surfaces and two wedge-like segments having inwardly directed noses projecting into said recessed portion, and resilient pressure means arranged between the juxtaposed end surfaces of said noses.

14. An adjuster as defined in claim 13, wherein during the fully extended position of said pressure means in which said segments are in said locking position said noses are spaced apart about a small distance from said abutment radial surfaces.

* * * * *